(12) United States Patent
Tokoro et al.

(10) Patent No.: US 11,652,938 B2
(45) Date of Patent: May 16, 2023

(54) DOCUMENT CONVEYANCE DEVICE AND IMAGE FORMING SYSTEM

(71) Applicant: KYOCERA Document Solutions Inc., Osaka (JP)

(72) Inventors: Yoshitaka Tokoro, Osaka (JP); Takafumi Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/669,036

(22) Filed: Feb. 10, 2022

(65) Prior Publication Data
US 2022/0263961 A1    Aug. 18, 2022

(30) Foreign Application Priority Data

Feb. 16, 2021  (JP) .............................. JP2021-022613

(51) Int. Cl.
 *H04N 1/00* (2006.01)
(52) U.S. Cl.
 CPC ..... *H04N 1/00631* (2013.01); *H04N 1/00602* (2013.01); *H04N 1/00615* (2013.01); *H04N 1/00795* (2013.01); *H04N 2201/0094* (2013.01)
(58) Field of Classification Search
 CPC .... B65H 31/02; B65H 5/062; B65H 2220/01; B65H 2220/04; B65H 2301/4212; B65H 2405/11151; B65H 2405/332; B65H 5/38; B65H 2220/11; B65H 2301/33312; B65H 2402/10; B65H 2405/1111; B65H 2405/11164; B65H 2405/1124; B65H 2405/12; B65H 2407/20; B65H 2408/111; B65H 2511/11; B65H 2511/20; B65H 2601/11; B65H 29/52; B65H 31/20; B65H 31/24; B65H 31/26; B65H 31/34; B65H 1/04; B65H 1/14; B65H 1/18; B65H 1/266; B65H 2220/02; B65H 2301/4213;

(Continued)

(56) References Cited

U.S. PATENT DOCUMENTS

| | | | | |
|---|---|---|---|---|
| 6,102,506 A | * | 8/2000 | Sasai | .................. H04N 1/00631 347/3 |
| 6,522,862 B2 | * | 2/2003 | Koshimizu | ........ H04N 1/00633 399/362 |

(Continued)

FOREIGN PATENT DOCUMENTS

JP    2019-131339 A    8/2019

*Primary Examiner* — Negussie Worku
(74) *Attorney, Agent, or Firm* — Studebaker & Brackett PC (57) ABSTRACT

An image forming apparatus includes a sheet feeding tray, a sheet discharge tray, and a conveyance mechanism. The conveyance mechanism includes a guide part, a first turning shaft, a second turning shaft, a coupling member and a drive part. The guide part has a sheet discharge port. The first turning shaft supports the guide part so as to be turned around an axis along a width direction crossing to the conveyance direction. The second turning shaft is provided on the downstream side of the first turning shaft and below the guide part. The coupling member has one end portion supported by the second turning shaft in a turnable manner and the other end portion provided so as to be slidable with respect to the guide part. The drive part turns the coupling member around the second turning shaft to change a height of the sheet discharge port.

8 Claims, 12 Drawing Sheets

(58) Field of Classification Search
CPC .......... B65H 2402/441; B65H 2402/54; B65H 2402/60; B65H 2403/411; B65H 2403/47; B65H 2403/513; B65H 2403/53; B65H 2404/1114; B65H 2404/1421; B65H 2404/143; B65H 2404/611; B65H 2405/1116; B65H 2405/15; B65H 2408/114; B65H 2511/10; B65H 2511/22; B65H 2511/224; B65H 2701/1131; B65H 2701/18262; B65H 2801/06; B65H 2801/09; B65H 2801/27; B65H 29/22; B65H 29/44; B65H 31/3018; B65H 5/26; B65H 1/022; B65H 2301/42344; B65H 2403/512; B65H 2408/112; B65H 2511/24; B65H 2511/514; B65H 2513/10; B65H 2513/51; B65H 2553/61; B65H 2557/20; B65H 2557/24; B65H 2557/60; B65H 2557/61; B65H 2601/322; B65H 2701/1313; B65H 3/0607; B65H 3/0661; B65H 7/02; G03G 15/6552; G03G 15/10; G03G 15/20; G03G 2215/0629; G03G 21/1633; G03G 15/0865; G03G 15/0886; G03G 15/6505; G03G 15/6529; G03G 21/1647; G03G 21/1676; G03G 2215/00392; G03G 2221/1684; G03G 2221/1696; G03G 15/167; G03G 15/6573; G03G 21/206; G03G 2221/169; B41J 17/28; B41J 2/325; B41J 35/18; F16D 41/22; Y10T 74/20
USPC ........................................................ 358/498
See application file for complete search history.

(56) References Cited

U.S. PATENT DOCUMENTS

| | | | | |
|---|---|---|---|---|
| 8,517,373 | B2* | 8/2013 | Harada | B65H 3/0684 |
| | | | | 271/118 |
| 9,417,586 | B2* | 8/2016 | Izumichi | G03G 15/6573 |
| 11,274,005 | B2* | 3/2022 | Kusumi | B65H 3/0669 |
| 11,312,587 | B2* | 4/2022 | Doyo | B65H 3/5215 |
| 11,438,475 | B2* | 9/2022 | Mizuno | H04N 1/00604 |
| 2006/0103068 | A1* | 5/2006 | Sekiya | B65H 29/52 |
| | | | | 271/264 |
| 2013/0170003 | A1* | 7/2013 | Yabuuchi | H04N 1/00084 |
| | | | | 358/498 |
| 2019/0002220 | A1* | 1/2019 | Daigo | B65H 1/14 |
| 2019/0127165 | A1* | 5/2019 | Yoshida | H04N 1/00615 |
| 2021/0099591 | A1* | 4/2021 | Arakawa | H04N 1/00602 |
| 2021/0099594 | A1* | 4/2021 | Ochi | H04N 1/00615 |
| 2022/0073296 | A1* | 3/2022 | Oshiro | B65H 3/06 |
| 2022/0182506 | A1* | 6/2022 | Fuji | H04N 1/00631 |
| 2022/0185606 | A1* | 6/2022 | Hagihara | B65H 7/02 |
| 2022/0407971 | A1* | 12/2022 | Nishinohara | H04N 1/00615 |

* cited by examiner

DOCUMENT CONVEYANCE DEVICE AND IMAGE FORMING SYSTEM

INCORPORATION BY REFERENCE

This application is based on and claims the benefit of priority from Japanese patent application No. 2021-022613 filed on Feb. 16, 2021, which is incorporated by reference in its entirety.

BACKGROUND

The present disclosure relates to a document conveyance device which conveys a document to a reading position of an image reading device and an image forming system including the document conveyance device.

A document conveyance device which conveys a document to a reading position of an image reading device is known. For example, the document conveyance device includes a sheet feeding tray on which the document is placed, a sheet discharge tray provided below the sheet feeding tray, and a conveyance mechanism which convey the document along a conveyance path from the sheet feeding tray to the sheet discharge tray via the reading position of the document reading device. In the downstream side end of the conveyance path in the conveyance direction, a sheet discharge port is formed. The document is discharged through the sheet discharge port and then stacked on the sheet discharge tray.

The convenience of the document conveyance device is enhanced as the stacking capacity (the amount of the documents which can be stacked) of the sheet discharge tray is increased. In order to increase the stacking capacity of the sheet discharge tray, it is necessary to set the position of the sheet discharge port relative to the sheet discharge tray higher. However, if the sheet discharge port is simply set to be higher, the position and posture of the document to be discharged is disturbed, and it takes time for the user to align the documents taken out from the sheet discharge tray. Therefore, a technique for raising and lowering the sheet discharge port has been studied. For example, a configuration in which the sheet discharge port is set to be higher in response to a decrease in the number of the documents placed on the sheet feeding tray is proposed.

However, in the above configuration, because the discharge unit is turned by transmitting a drive force to the gear provided in the turning shaft of the discharge unit, high torque is required, and it has a problem of low adjustment accuracy of the height of the sheet discharge port.

SUMMARY

In accordance with an aspect of the present disclosure, an image forming apparatus includes a sheet feeding tray, a sheet discharge tray, and a conveyance mechanism. On the sheet feeding tray, a document is placed. The sheet discharge tray is provided below the sheet feeding tray. The conveyance mechanism conveys the document along a conveyance path from the sheet feeding tray to the sheet discharge tray via a reading position. The conveyance mechanism includes a guide part, a first turning shaft, a second turning shaft, a coupling member and a drive part. The guide part is provided as the conveyance path on a downstream side of the reading position in a conveyance direction of the document, and has a sheet discharge port through which the document is discharged to the sheet discharge tray. The first turning shaft supports the guide part so as to be turned around an axis along a width direction of the document crossing to the conveyance direction. The second turning shaft is provided on the downstream side of the first turning shaft in the conveyance direction and below the guide part, and its axial direction is along the width direction. The coupling member has one end portion supported by the second turning shaft in a turnable manner and the other end portion provided so as to be slidable with respect to the guide part. The drive part turns the coupling member around the second turning shaft to change a height of the sheet discharge port.

In accordance with an aspect of the present disclosure, an image forming system includes the sheet conveyance device; an image reading device which reads the document conveyed by the sheet conveyance device at the reading position; and an image forming device which forms an image read by the image reading device on a sheet.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, a multifunctional peripheral 100 (an example of an image forming system) according to one embodiment in the present disclosure will be described.

Figure 1:
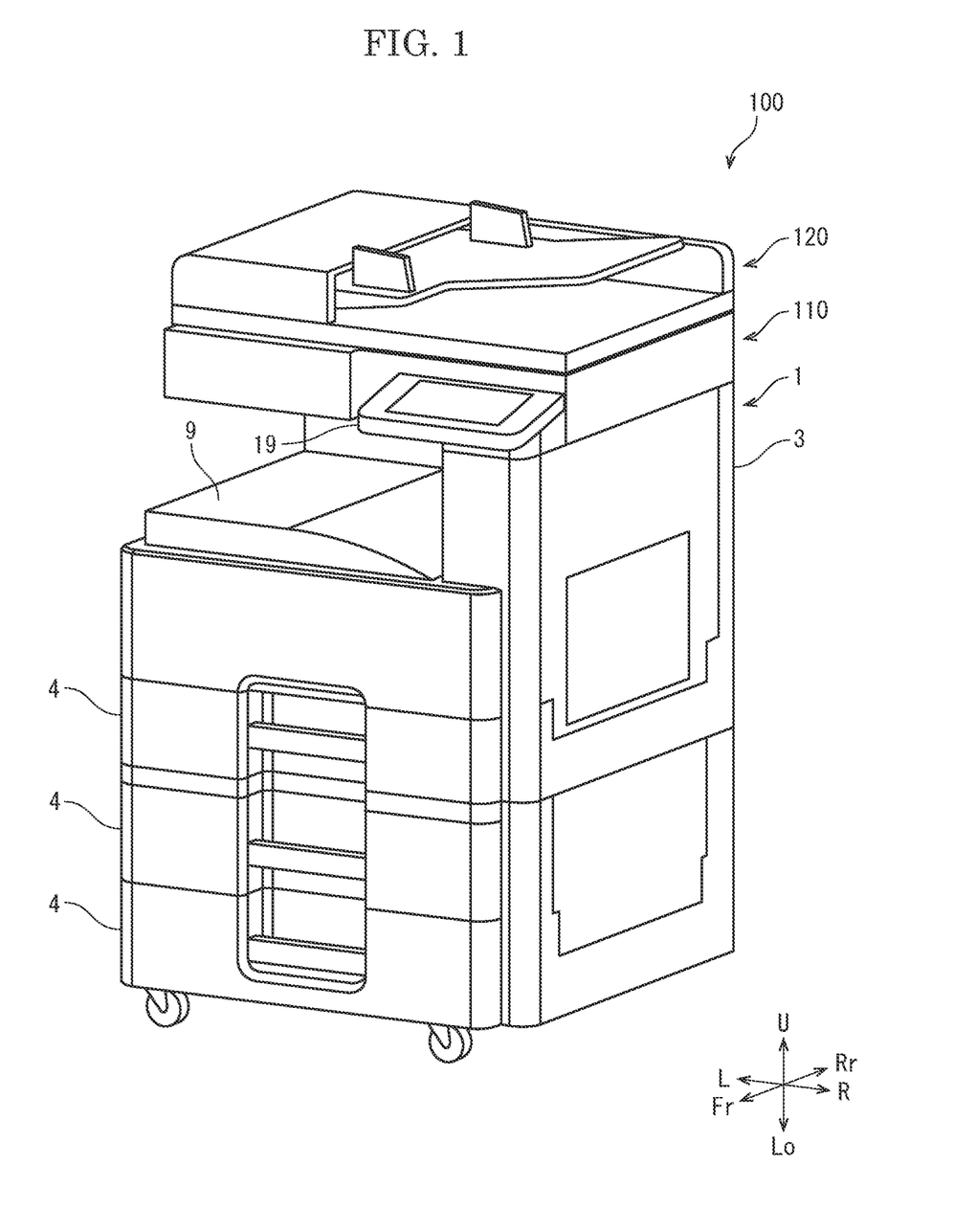
FIG. 1 is a perspective view showing an external appearance of a multifunctional peripheral according to one embodiment of the present disclosure.
Figure 2:
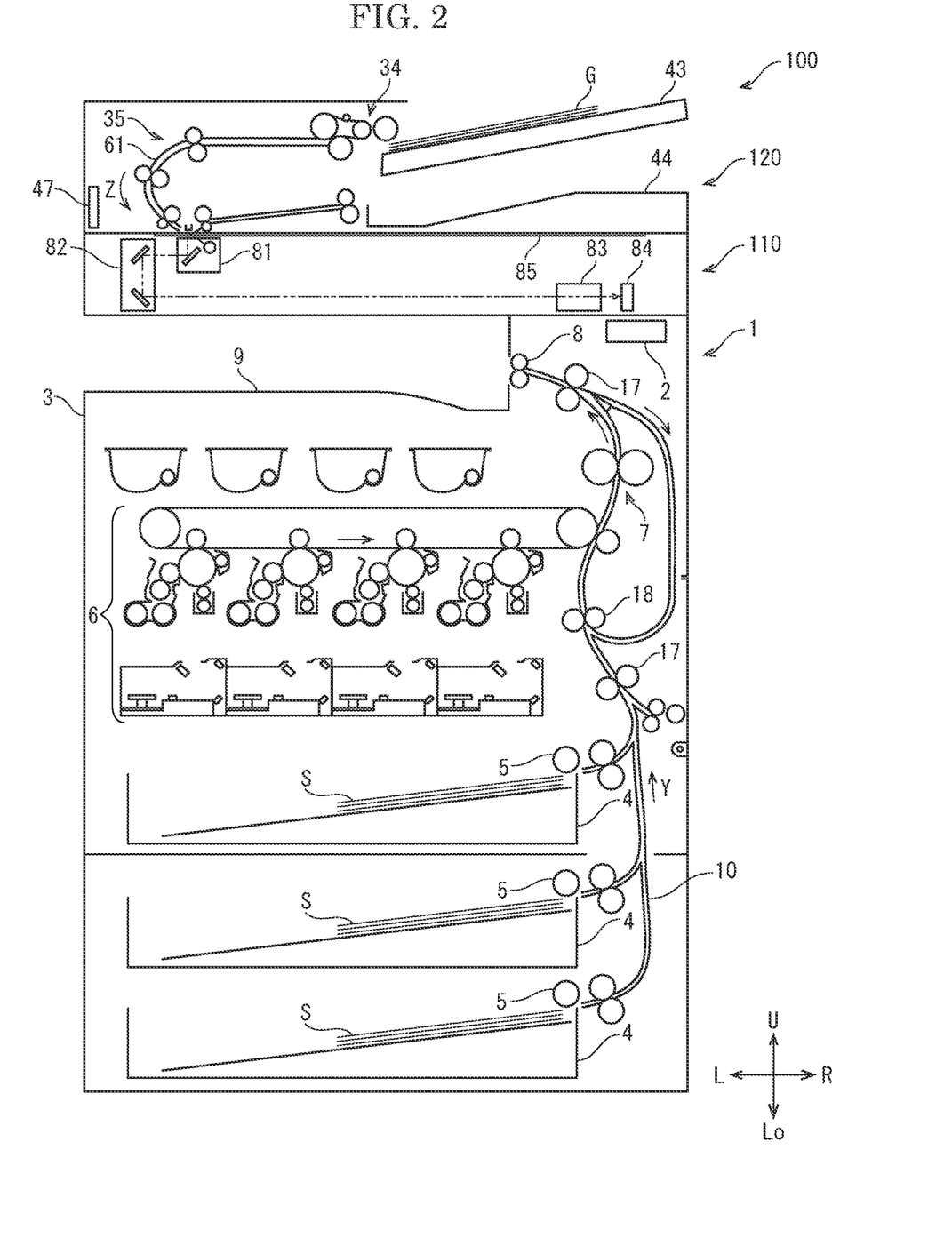
FIG. 2 is a front view schematically showing an internal structure of the multifunctional peripheral according to the embodiment of the present disclosure.

First, an outline of the multifunctional peripheral 100 will be described. FIG. 1 is a perspective view showing an external appearance of the multifunctional peripheral 100. FIG. 2 is a front view schematically showing an internal structure of the multifunctional peripheral 100. In the following description, a front side of the paper plane on which FIG. 2 is drawn is defined as a front side of the multifunctional peripheral 100, and the left-and-right direction is based on a direction in which the multifunctional peripheral 100 is viewed from the front side. U, Lo, L, R, Fr and Rr marked in each drawing indicate the upper, the lower, the left, the right, the front and the rear, respectively.

The multifunctional peripheral 100 includes a printer 1 (an example of an image forming apparatus), a scanner 110 (an example of an image reading device) and a document conveyance device 120. The scanner 110 is disposed above the printer 1, and the document conveyance device 120 is disposed above the scanner 110. The printer 1 forms an image on a sheet S in an electrophotographic manner. The scanner 110 is a flat head type image scanner which reads a document G and generates image data. The document conveyance device 120 conveys the document G along a conveyance path 61 passing through a reading position of the scanner 110.

The printer 1 and the scanner 110 are integrated into one parallelepiped housing 3. In the lower portion of the inside of the housing 3, a sheet feeding cassette 4 in which the sheet S is stored and a sheet feeding roller 5 which feeds the sheet S from the sheet feeding cassette 4 are provided. Above the sheet feeding cassette 4, an image forming device 6 which forms a toner image in an electrophotographic manner is provided, and on the right upper side of the image forming device 6, a fixing device 7 which fixes the toner image on the sheet S is provided. On the left upper side of the fixing device 7, a sheet discharge rollers pair 8 which discharges the sheet S on which the toner image has been fixed and a sheet discharge tray 9 on which the discharged sheet S is stacked are provided.

Inside the housing 3, a conveyance path 10 is provided from the sheet feeding roller 5 to the discharge rollers pair 8 through the image forming device 6 and the fixing device 7. The conveyance path 10 is formed by plate-shaped members facing each other via a space through which the sheet S can be passed. A plurality of conveyance rollers pairs 17 which holds the sheet S and conveys it are provided on the conveyance path 10 along the conveyance direction Y. On the upstream side of the image forming device 6 in the conveyance direction Y, a registration rollers pair 18 is provided.

A controller 2 includes a processor and a memory. The processer is a CPU (Central Processing Unit), for example. The memory includes a storage such as a ROM (read Only Memory), a RAM (Random Access Memory) and an EEPROM (Electrically Erasable Programmable Read Only Memory). The processer reads and executes control program stored in the memory to perform various processing. The controller 2 may be achieved by an integrated circuit without using software.

On the front side of the scanner 110, an operation panel 19 is provided. The operation panel 19 includes a display panel, a touch panel overlapped on the display surface of the display panel, and a key pad adjacent to the display panel. The controller 2 causes the display panel to display an operation menu of the printer 1 and the scanner 110, and controls each part of the printer 1, the scanner 110 and the document conveyance device 120 according to the operation detected by the touch panel and the key pad.

A typical image forming operation of the printer 1 is as follows. When a printing job is input to the printer 1 from an external computer, the sheet feeding roller 5 feeds the sheet S from the sheet feeding cassette 4 to the conveyance path 10, the registration rollers pair 18 in a state where the rotating is stopped corrects a skew of the sheet S, and then the registration rollers pair 10 is rotated at a predetermined timing to feed the sheet S to the image forming device 6. In the image forming device 6, a charge device charges a photosensitive drum to a predetermined potential, an exposure device writes an electrostatic latent image on the photosensitive drum, a development device develops the electrostatic latent image with a toner supplied from a toner container to form the toner image, a primary transfer roller transfers the toner image from the photosensitive drum to an intermediate transfer belt, and then a secondary transfer roller transfers the toner image on the intermediate transfer belt to the sheet S. Then, the fixing device 7 heats the toner image while holding and conveying the sheet S to fix the toner image on the sheet S, and the discharge rollers pair 8 discharges the sheet S to the discharge tray 9. A cleaning device removes the toner remaining on the photosensitive drum.

Next, the scanner 110 will be described. The scanner 110 includes a first carriage 81 provided with a light source and a reflection mirror, a second carriage 82 provided with two reflection mirrors, a lens 83 which focuses the light, an imaging element 84 which converts the focused light into image data, and a contact glass 85 on which the document G is placed.

When the user places the document G on the upper surface of the contact glass 85 and inputs a copying instruction or a reading instruction to the operation panel 19, the first carriage 81 is moved rightward at a speed V while the second carriage 82 is moved rightward at a speed V/2. During that, the light source irradiates the document G with the light, the reflection light reflected on the document G is reflected by the reflection mirror of the first carriage 81 and the reflection mirrors of the second carriage 82 to be guided to the lens 83 and then focused on the imaging elements 84. The imaging element 84 converts the reflection light into the image data, and transmits it to the controller 2 of the printer 1. In the copying, the exposure device writes the electrostatic latent image corresponding to the image data on the photosensitive drum. In the reading, the controller 2 makes the memory store the image data.

Figure 3:
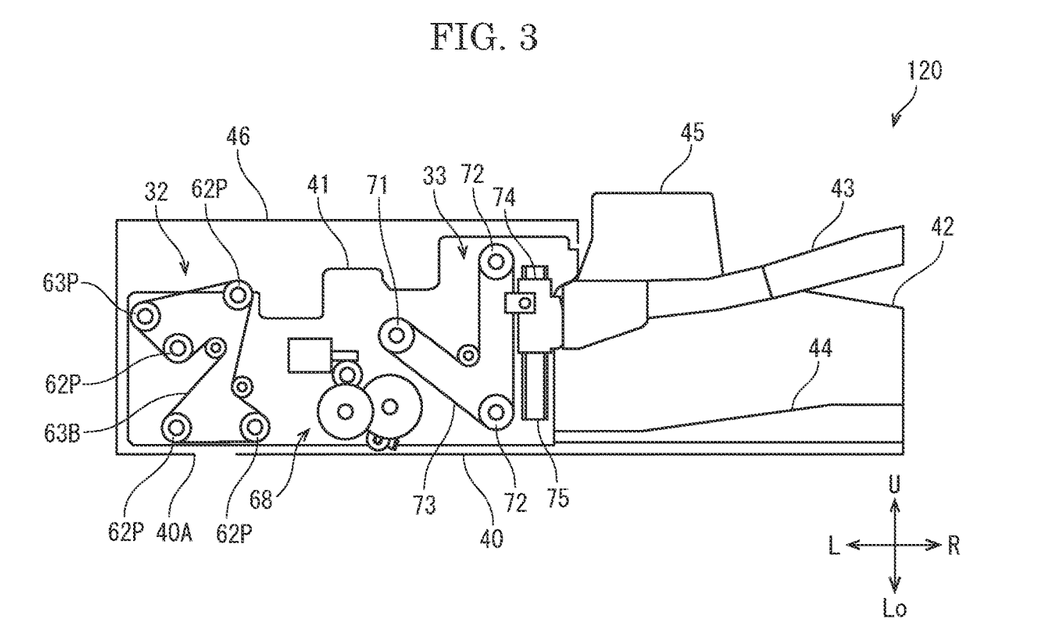
FIG. 3 is a front view schematically showing an internal structure of a document conveyance device according to the embodiment of the present disclosure.
Figure 4:
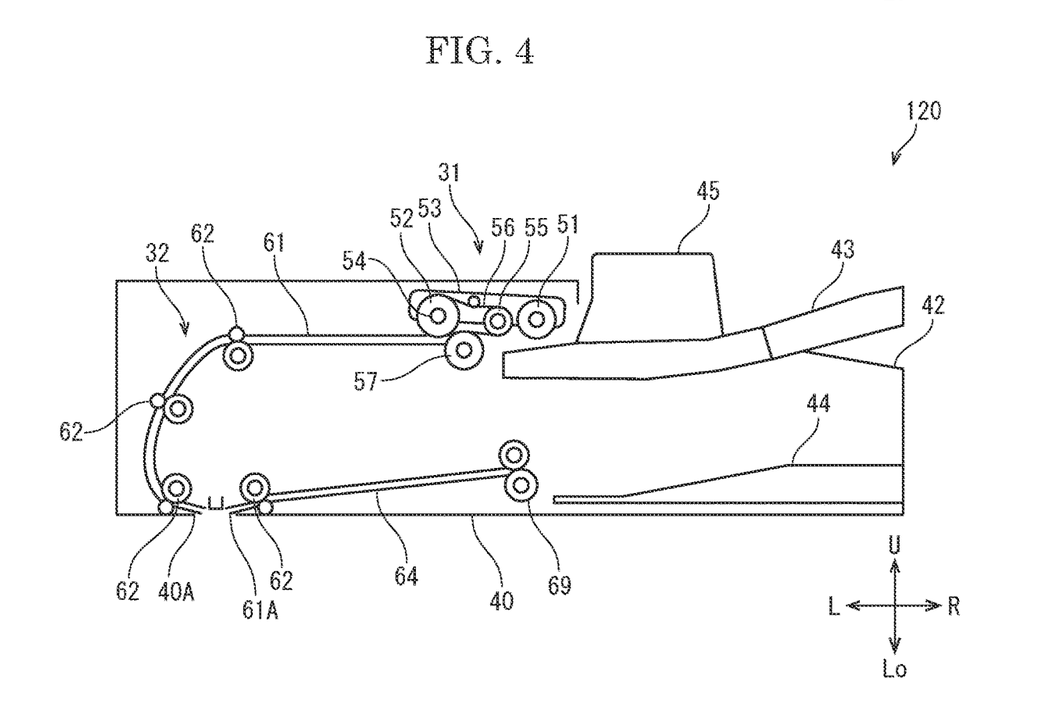
FIG. 4 is a front view schematically showing the internal structure of the document conveyance device according to the embodiment of the present disclosure.

[Document Conveyance Device] Next, the document conveyance device 120 will be described. FIG. 3 and FIG. 4 are front views schematically showing an internal structure of the document conveyance device 120. The document conveyance device 120 includes an approximately rectangular bottom part 40 formed in a flat shape, a first wall part 41 and a second wall part 42 facing each other in the front-and-rear direction. The rear end portion of the bottom part 40 is hinge-coupled to the scanner 110 on the rear side of the contact glass 85 (see FIG. 2), and the bottom part 40 is used as a holding plate which holds the document G on the contact glass 85. The first wall part 41 is provided along the left half of the front end portion of the bottom part 40, and the second wall 42 is provided along the whole of the rear end portion of the bottom part 40.

[Sheet Feeding Tray] A sheet feeding tray 43 is provided above the right half of the bottom part 40. The sheet feeding tray 43 is a plate-shaped member inclined downward to the left side, and is provided with cursors 45 which aligns the document G in the front-and-rear direction.

[Sheet Discharge Tray] A sheet discharge tray 44 is provided on the right half of the bottom part 40, that is, below the sheet feeding tray 43. In the center portion of the sheet discharge tray 44, an inclined surface inclined downward to the left side is formed.

[Raising and Lowering mechanism] A raising and lowering mechanism 33 (see FIG. 3) is provided on the front side and the rear side of the sheet feeding tray 43. The raising and lowering mechanism 33 includes a drive pulley 71, a driven pulley 72, a belt 73 wound around the drive pulley 71 and the driven pulley 72, a sliding member 74 fixed on the belt 73, a raising guide part 75 which guides the sliding member 74 so as to be raised and lowered, and a drive part (not shown) which drives the drive pulley 71. The raising guide part 75 is a rail-shaped member whose longitudinal direction is along the upper-and-lower direction, and is provided in each of the first wall part 41 and the second wall part 42. The sliding member 74 is a member slidable along the raising guide part 75, and is fixed to the sheet feeding tray 43 and the belt 73 (a portion wound in the upper-and-lower direction). The drive part includes a motor and a reduction gear train. When the drive pulley 71 is driven, the belt 73 is traveled to raise and lower the sheet feeding tray 43. The sheet feeding tray 43 may be raised and lowered depending on an amount of the documents G placed on the sheet feeding tray 43, or with the turning of a guide part 64 described later. The detail description of the raising and lowering of the sheet feeding tray 43 is omitted.

[Feeding Mechanism] A feeding mechanism 31 (see FIG. 4) is provided in a space between the first wall part 41 and the second wall part 42. The feeding mechanism 31 includes a box-shaped holder 53 whose lower surface is opened. In the holder 53, a feeding roller 51, a driven roller 55 disposed on the left side of the feeding roller 51, a drive roller 52 disposed on the left side of the driven roller 55, a rubber belt 56 wound around the drive roller 52 and the driven roller 55, and an auxiliary roller 57 pressed on the lower surface of the lower traveling portion of the belt 56.

The feeding roller 51, the driven roller 55, the drive roller 52 and the auxiliary roller 57 are disposed in a posture where their axial directions are along the front-and-rear direction. The feeding roller 51 has a core bar and an elastic layer made of rubber (not shown). The driven roller 55, the drive roller 52 and the auxiliary roller 57 are made of resin. The front and rear end portions of the drive shaft 54 of the drive roller 52 are supported by the first wall part 41 and the second wall part 42, and are connected to a drive part (not shown) including a motor and a reduction gear train. The holder 53 is supported by the drive shaft 54, and is turnable around the drive shaft 54. A drive force of the drive shaft 54 is transmitted to the feeding roller 51 via a transmission mechanism (not shown) such as a gear train or a timing belt.

[Conveyance Mechanism] A conveyance mechanism 32 (see FIG. 3 and FIG. 4) includes the curved conveyance path 61 from the feeding mechanism 31 to a discharge rollers pair 69 through an opening 40A, and a plurality of conveyance rollers pairs 62 disposed on the conveyance path 61. The opening 40A is a rectangular through hole whose longitudinal direction is along the front-and-rear direction, and is formed in the bottom part 40 at a position where it faces the first carriage 81 (see FIG. 2) positioned in a home position. The opening 40A is an example of a reading position at which the scanner 110 reads the document G. The conveyance path 61 is formed by plate-shaped members facing each other via a space through which the document G can be passed. At the reading position, the lower plate-shaped member of the conveyance path 61 has an opening 61A corresponding to the opening 40A. The lower surface of the document G being conveyed is exposed through the opening 40A and the opening 61A.

Each of the conveyance rollers pair 62 includes a drive roller and a driven roller (see FIG. 4), and a driven pulley 62P is coupled to the shaft of each drive roller (see FIG. 3). A drive part 63 includes a motor (not shown), a reduction gear train (not shown), and a drive pulley 63P (see FIG. 3) coupled to the final gear of the reduction gear train. Around the drive pulley 63P and the driven pulleys 62P, a belt 63B is wound. Thereby, the conveyance rollers pairs 62 are driven in synchronization with each other. Above the conveyance mechanism 32, an openable and closable cover 46 is provided. The left lower end portion of the cover 46 is hinge-coupled to the left end portion of the bottom part 40.

Figure 5:
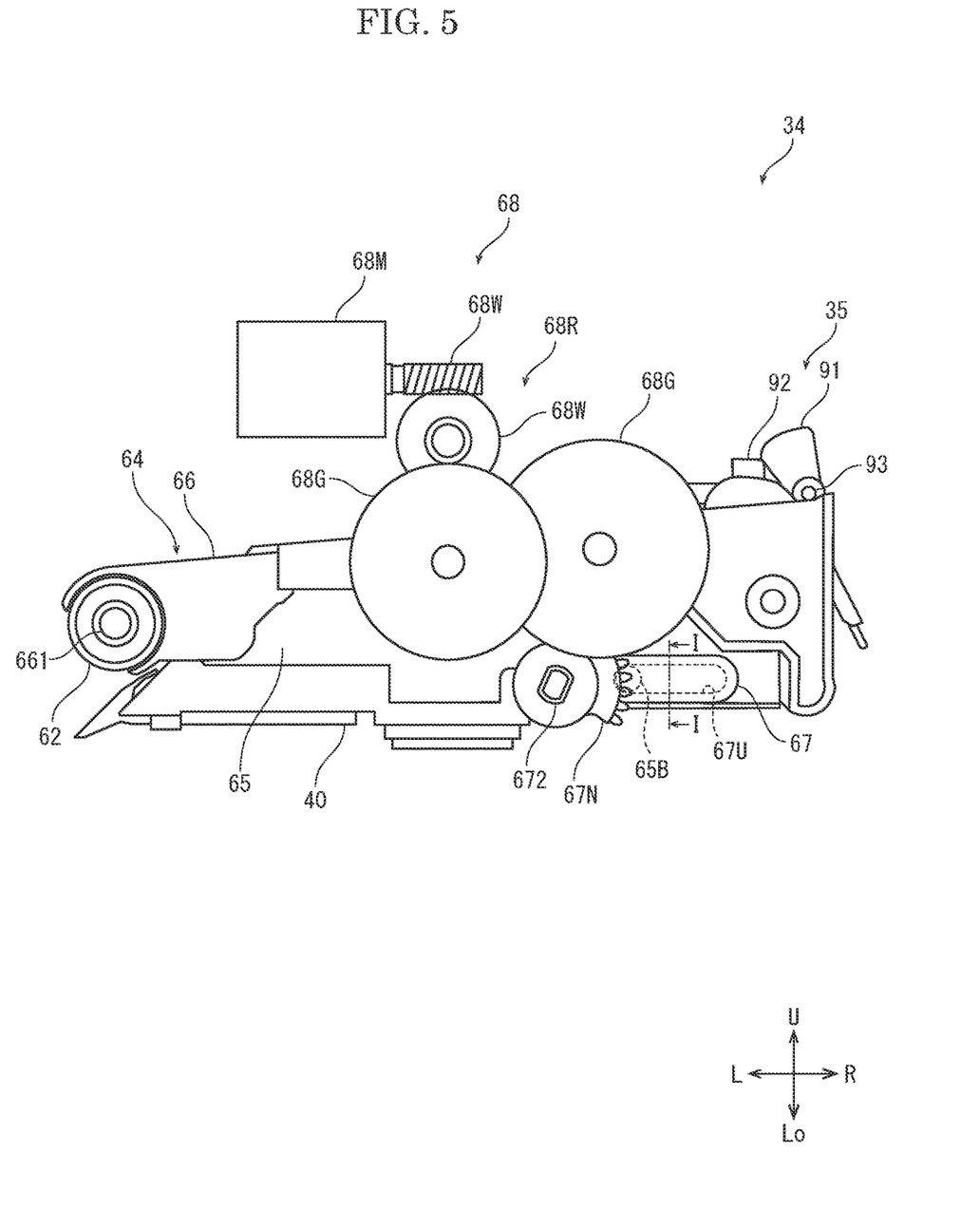
FIG. 5 is a front view showing a turning mechanism according to the embodiment of the present disclosure.
Figure 6:
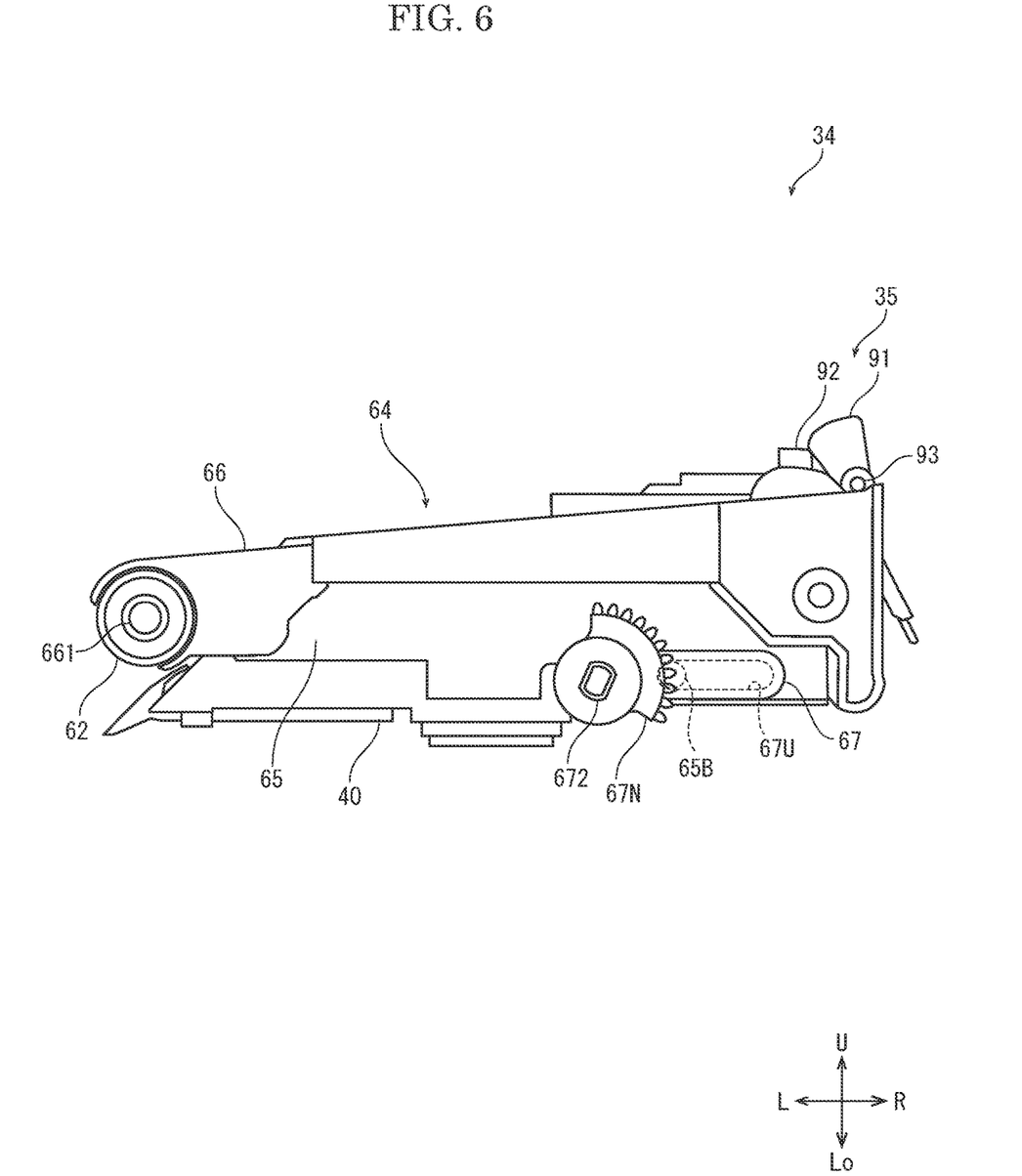
FIG. 6 is a front view showing the turning mechanism shown in FIG. 5 except a drive part.
Figure 7:
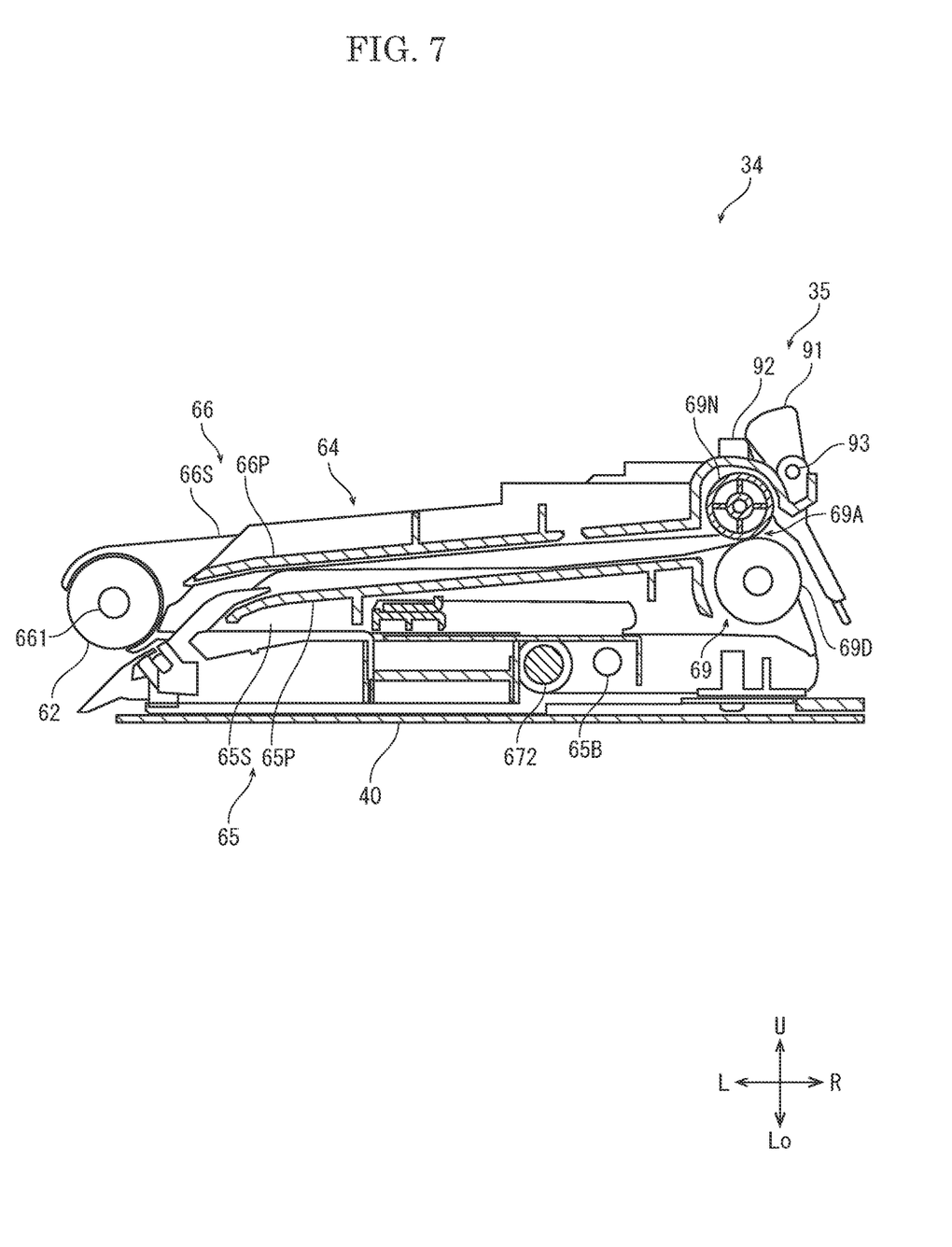
FIG. 7 is a sectional view showing a guide part according to the embodiment of the present disclosure.
Figure 8:
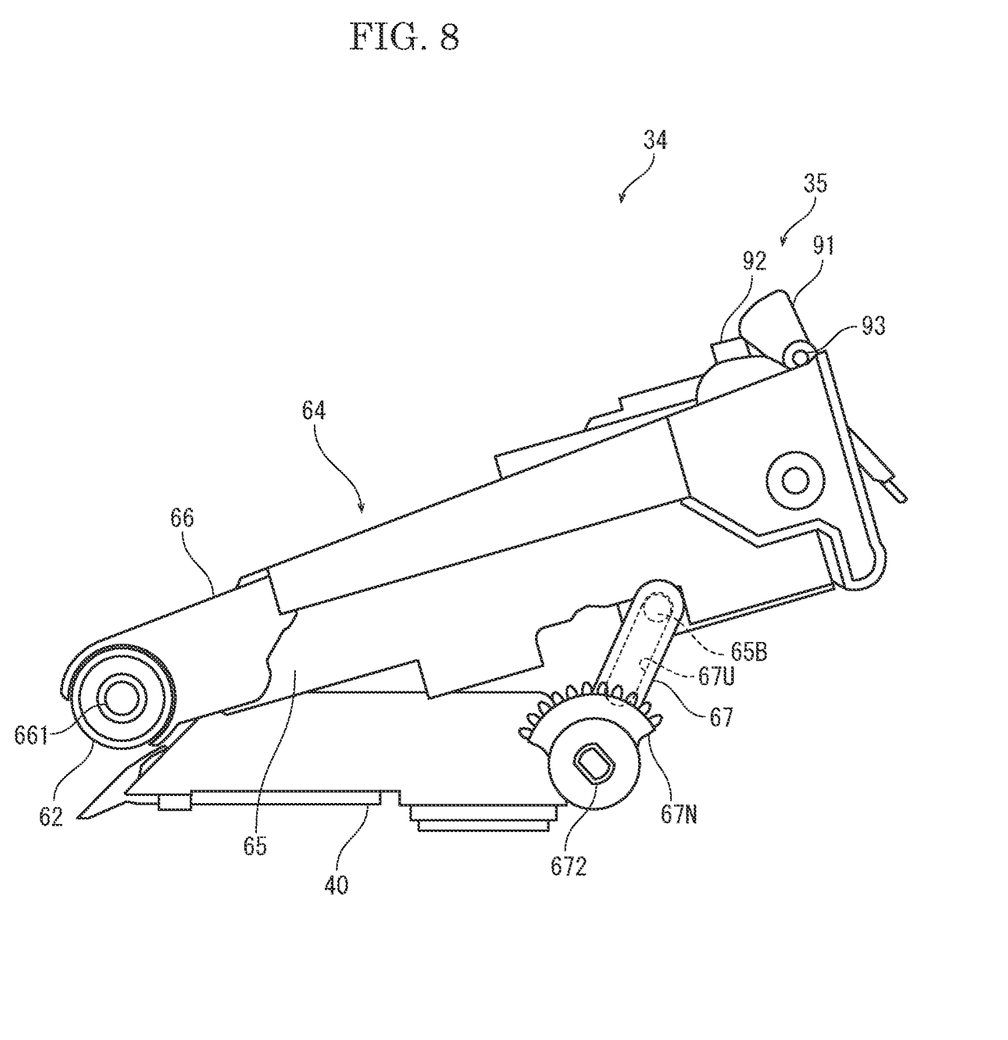
FIG. 8 is a front view of the guide part shown in FIG. 6 when turned in the counterclockwise direction.
Figure 9:
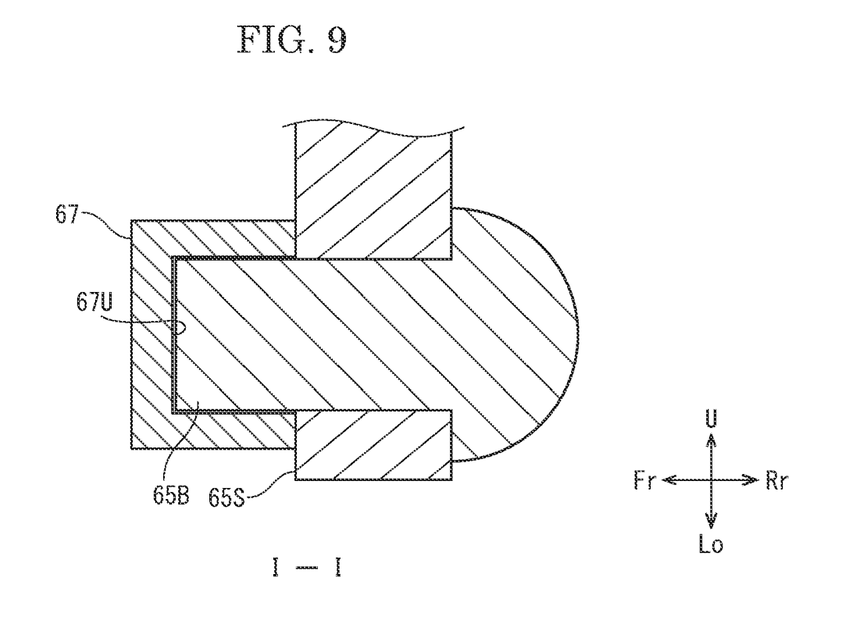
FIG. 9 is a sectional view taken along the line I-I in FIG. 5.
Figure 10:
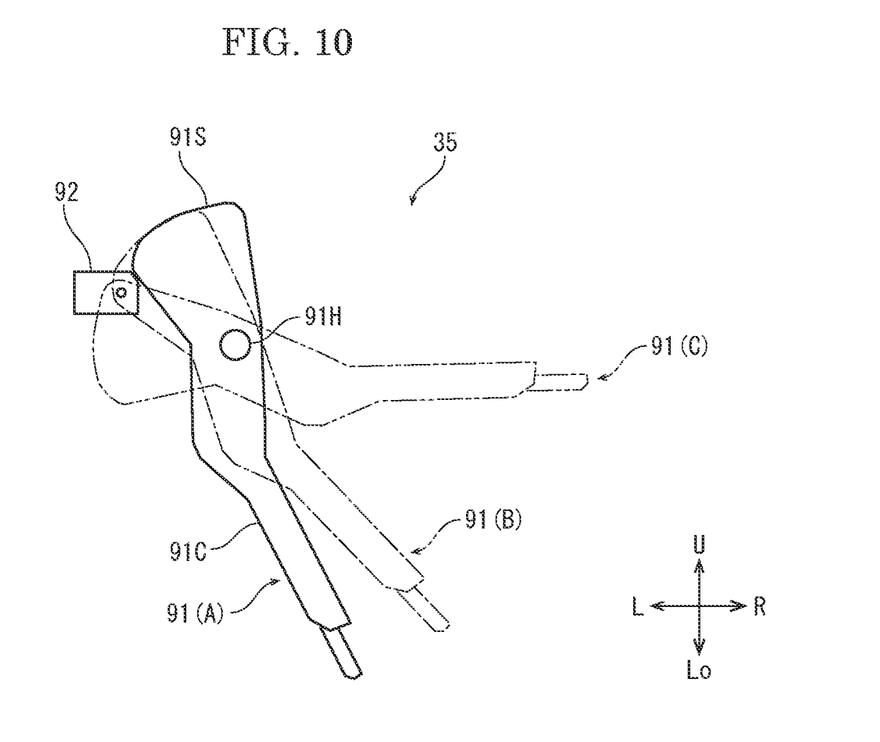
FIG. 10 is a front view showing a detection part according to the embodiment of the present disclosure.

In addition to the above structure, the conveyance mechanism 32 includes a guide part 64, a coupling member 67 and a drive part 68. FIG. 5 is a front view showing a turning mechanism 34. FIG. 6 is a front view showing the turning mechanism 34 shown in FIG. 5 except the drive part 68. FIG. 7 is a sectional view showing the guide part 64. FIG. 8 is a front view showing the guide part 64 shown in FIG. 6 when turned in the counterclockwise direction. FIG. 9 is a sectional view taken along the line I-I in FIG. 5. FIG. 10 is a front view showing a detection part 35.

The document conveyance device 120 includes the sheet feeding tray 43 on which the document G is placed, the sheet discharge tray 44 provided below the sheet feeding tray 43, and the conveyance mechanism 32 which conveys the document G along the conveyance path 61 from the sheet feeding tray 43 to the sheet discharge tray 44 through the reading position. The conveyance mechanism 32 includes the guide part 64, a first turning shaft 661, a second turning shaft 672, the coupling member 67 and the drive part 68. The guide part 64 is provided as the conveyance path 61 on the downstream side of the reading position in the conveyance direction Z (see FIG. 2), and has a sheet discharge port 69A through which the document G is discharged to the sheet discharge tray 44. The first turning shaft 661 supports the guide part 64 so as to be turned around an axis along the width direction of the document G crossing to the conveyance direction Z. The second turning shaft 672 whose axial direction is along the width direction is provided on the downstream side of the first turning shaft 661 in the conveyance direct Z and below the guide part 64. One end portion of the coupling member 67 is supported by the second turning shaft 672 in a turnable manner, and the other end portion of the coupling member 67 is provided to be slidable with respect to the guide part 64. The drive part 68 turns the coupling member 67 around the second turning shaft 672.

[Guide Part] The guide part 64 (see FIG. 6 and FIG. 7) is formed by integrating a lower guide member 65 and an upper guide member 66 facing each other in the upper-and-lower direction. The lower guide member 65 has an approximately rectangular plate-shaped part 65P constituting the lower side of the conveyance path 61 and support parts 65S which supports the front and rear end portions of the plate-shaped part 65P. The upper guide member 66 has an approximately rectangular plate-shaped part 66P constituting the upper side of the conveyance path 61 and support parts 66S which supports the front and rear end portions of the plate-shaped part 66P. The left end portions of the front and rear support parts 66S of the upper guide member 66 are supported by the shaft (the first turning shaft 661) of the drive roller of the conveyance rollers pair 62 disposed on the right side of the opening 40A. The guide part 64 is turnable around the first turning shaft 661.

In the right end portion of the guide part 64, the discharge rollers pair 69 is provided. The discharge rollers pair 69 includes a drive roller 69D and a driven roller 69N disposed above the drive roller 69D. The drive roller 69D is supported by the right end portion of the support part 65S of the lower guide member 65, and the driven roller 69N is supported by the right end portion of the support part 66S of the upper guide member 66. A contact area between the drive roller 69D and the driven roller 69N is formed in the downstream end of the conveyance path 61 in the conveyance direction Z, and is used as the sheet discharge port 69A through which the document G is discharged from the conveyance path 61.

Each of the front and rear support parts 65S of the lower guide member 65 has a columnar protrusions 65B (see FIG. 9). In this embodiment, the protrusion 65B is formed by inserting a caulking pin into a through hole formed in the support part 65S. The protrusion 65B is preferably positioned away from the first turning shaft 661. For example, in the embodiment, the protrusion 65B is provided on the right side with respect to the center of the lower guide member 65 in the left-and-right direction. The protrusions 65B protrude forward or rearward. As an example, in the embodiment, the protrusion 65B provided in the front support part 65S protrudes forward and the protrusion 65B provided in the rear support part 65S protrudes rearward.

[Coupling member] On the front side and the rear side of the lower guide member 65, the coupling members 67 are provided (see FIG. 5 to FIG. 8). The front and rear coupling members 67 are supported by the second turning shaft 672 provided in the bottom part 40 below the guide part 64, and the front and rear coupling members 67 are turnable together around the second turning shaft 672. The second turning shaft 672 is provided on the left side or the right side of the protrusion 65B. As an example, in the embodiment, the second tuning shaft 672 is provided on the left side of the protrusion 65B, that is, between the first turning shaft 661 and the protrusion 65B.

The coupling member 67 has a groove 67U whose longitudinal direction is along a direction away from and close to the second turning shaft 672 (see FIG. 9). The grove 67U has a width slightly larger than the diameter of the protrusion 65B. The protrusion 65B is inserted into the groove 67U in a slidable manner along the groove 67U.

[Drive Part] The drive part 68 which drives the coupling member 67 is provided in the first wall part 41 or the second wall part 42 (the first wall part 41 in the embodiment) (see FIG. 5). The front coupling member 67 includes a driven gear 67N rotating around the second turning shaft 672. The drive part 68 includes a motor 68M and a reduction gear train 68R. The motor 68M is a DC brushless motor. The reduction gear train 68R includes a worm gear 68W provided in the shaft of the motor 68M, and one or more gears 68G which transmit a drive force from the worm gear 67W to the driven gear 67N. When the motor 68M is driven, the drive force is transmitted to the driven gear 67N through the reduction gear train 68R, and the front and rear coupling members 67 are turned together.

For example, when the motor 68M is driven in an initial state shown in FIG. 6, as shown in FIG. 8, the coupling members 67 are turned in the counterclockwise direction around the second turning shaft 672. With the turning of the coupling members 67, the protrusions 65B are slid along the grooves 67U in the direction away from the second turning shaft 672 and the guide part 64 is turned in the counter-clockwise direction around the first turning shaft 661, so that the sheet discharge port 69A is raised.

On the other hand, when the motor M is driven in the counter direction, the coupling members 67 are turned in the clockwise direction, the protrusions 65B are slid in the direction close to the second turning shaft 672, and the guide part 64 is turned in the clockwise direction, so that the sheet discharge port 69A is lowered.

[Detection Part] The detection part 35 detects the height of the documents G stacked on the sheet discharge tray 44 (see FIG. 5 to FIG. 8 and FIG. 10). The detection part 35 includes an actuator 91 and a sensor 92. The actuator 91 has a rod-shaped contact part 91C, an axial hole 91H provided in one end portion of the contact part 91C, and a plate-shaped light blocking part 91S. In the upper portion of the right end portion of the upper guide member 66, a third turning shaft 93 whose axial direction is along the width direction is provided. The actuator 91 is supported by the third turning shaft 93 through the axial hole 91H. The sensor 92 is a transmission type or a reflection type optical sensor. When the light emitted from the sensor 92 is blocked by the blocking part 91S, the turning of the actuator 91 is detected.

When the document G is discharged through the sheet discharge port 69A, and when the height of the documents G stacked on the sheet discharge tray 44 is less than the predetermined height, the tip end portion of the contact part 91C is positioned at the lowermost position (see the solid line A in FIG. 10). The state shown in FIG. 10 is referred to as the initial state, and the sensor 92 does not detect the blocking part 91S.

In a case where the actuator 91 is turned to a region within about 15° to about 65° with respect to the initial state in the counterclockwise direction, the sensor 92 detects the blocking part 91S. A state where the actuator 91 is turned by about 15° in the counterclockwise direction with respect to the initial state is referred to as a lower position detection state (see the one-dot chain line B in FIG. 10). A state where the actuator 91 is turned by about 65° in the counterclockwise direction with respect to the initial state is referred to as a high position detection state (see the two-dot chain line C in FIG. 10).

A controller 47 (see FIG. 2) includes a processor and a memory. The processer is a CPU (Central Processing Unit), for example. The memory includes a storage such as a Rom (Read Only Memory), a RAM (Random Access Memory), an EEPROM (Electrically Erasable Programmable Read Only Memory). The processer reads and executes control program stored in the memory to perform various processing. The controller 47 may be achieved by an integrated circuit without using software.

Next, an operation of the document conveyance device 120 will be described. When the document G is discharged through the sheet discharge port 69A, the document G comes into contact with the tip end portion of the contact part 91c, and the actuator 91 is turned in the counterclockwise direction to the high position detection state through the low position detection state. However, when the stacking height of the documents G is less than the predetermined height, after the document G is discharged, the tip end portion of the contact part 91C does not come into contact with the upper surface of the document G. Therefore, the actuator 91 is returned to the initial state.

When the stacking height of the documents G reaches the predetermined height, after the document G is discharged, the tip end portion of the contact part 91C comes into contact with the upper surface of the documents G. Thereafter, at each time when the document G is discharged, the height of the tip end portion of the contact part 91C is increased by a thickness of one document G, and the tip end portion of the contact part 91C reaches the low position detection state. Then, the controller 47 transmits a control signal to the drive part 68, and raises the sheet discharge port 69A such that a space of the predetermined height (about several millimeters) is formed between the tip end portion of the contact part 91C and the upper surface of the documents G. For example, when the sheet discharge port 69A is further raised, the sensor 92 does not detect the light blocking part 91S at a certain point, but the motor 68M is continuously driven for a predetermined time from that point, so that a space of the predetermined height is formed between the tip end portion of the contact part 91C and the upper surface of the documents G. By executing the above control each time when the actuator 91 reaches the low position detection state, the difference in height between the sheet discharge port 69A and the upper surface of the documents G stacked on the sheet discharge tray 44 is maintained within a predetermined range.

According to the document conveyance device 120 of the present embodiment described above, the conveyance mechanism 32 includes the guide part 64, the first turning shaft 661, the second turning shaft 672, the coupling member 67 and the drive part 68. The guide part 64 is provided as the conveyance path 61 on the downstream side of the reading position in the conveyance direction Z (see FIG. 2), and has the sheet discharge port 69A through which the document G is discharged to the sheet discharge tray 44. The first turning shaft 661 supports the guide part 64 so as to be turned around an axis along the width direction of the document G crossing to the conveyance direction Z. The second turning shaft 672 whose axial direction is along the width direction is provided on the downstream side of the first turning shaft 661 in the conveyance direct Z and below the guide part 64. One end portion of the coupling member 67 is supported by the second turning shaft 672 in a turnable manner, and the other end portion of the coupling member 67 is slidable with respect to the guide part 64. The drive part 68 turns the coupling member 67 around the second turning shaft 672. According to the configuration, it becomes possible to raise and lower the sheet discharge port 67A freely so that it becomes possible to suppress the distribution of the position and posture of the discharged documents G even if the stacking amount of the documents G is increased. Further, it is not required to set the sheet discharge port 69A higher in order to increase the stacking amount of the documents G on the sheet discharge tray 44, so that the space saving in the height direction of the document conveyance device 120 can be achieved. Further, the drive force is acted on a position far from the first turning shaft 661 of the guide part 64, so that the accurate height adjustment of the sheet discharge port 69A can be performed with low torque.

Further, according to the document conveyance device 120 of the present embodiment, the guide part 64 has the protrusions 65B protruding in the width direction, and the coupling member 67 has the grooves 67U in which the protrusions 65B are slidable in the directions away from and close to the second turning shaft 672. Accordingly, it becomes possible to turn the guide part 64 with a simple structure.

Further, according to the document conveyance device 120 of the present embodiment, the drive part 68 include the reduction gear train 68R containing the worm gear 68W. Accordingly, it becomes possible to increase the reduction ratio.

Further, according to the document conveyance device 120 of the present embodiment, the controller 2 which controls the drive part 68 such that the height of the sheet discharge port 69A is changed according to the amount of the documents G stacked on the sheet discharge tray 44 is provided. Therefore, it becomes possible to maintain the difference in height between the sheet discharge port 69A and the upper surface of the documents G within the predetermined range.

The above embodiment may be modified as follows.

In the above embodiment, an example where the detection part 35 detects the height of the documents G using the actuator 91 is shown, but the detection part 35 may have any configuration. For example, the detection part 35 may be configured to emit light on the upper surface of the documents G stacked on the sheet discharge tray 44 and to detect the height of the upper surface of the document G using the phase shift of the reflected light. With this configuration, the same effects as those of the above-described embodiment can be obtained.

Figure 11:
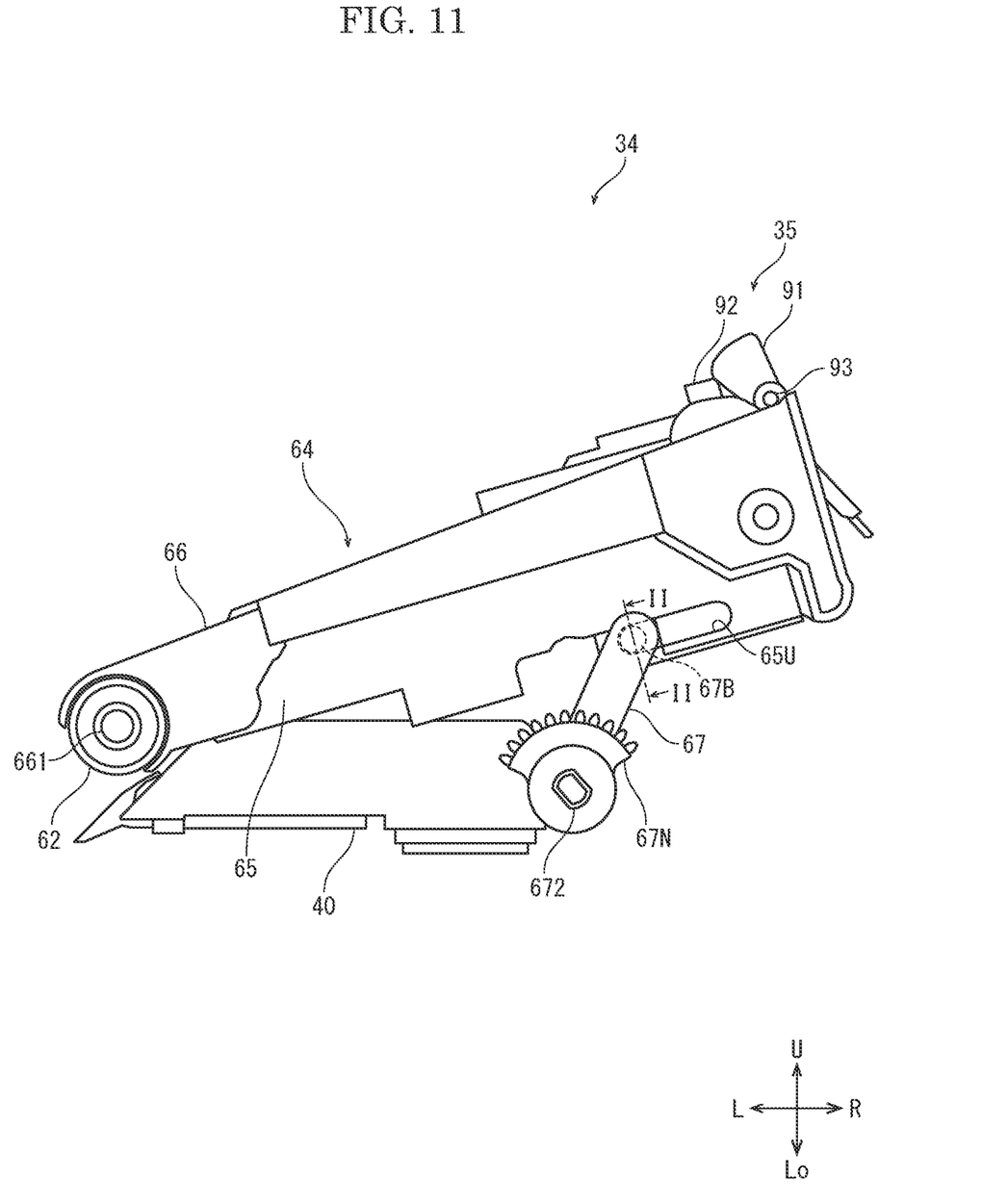
FIG. 11 is a front view showing the turning mechanism 34 of a modified example of the embodiment of the present disclosure.
Figure 12:
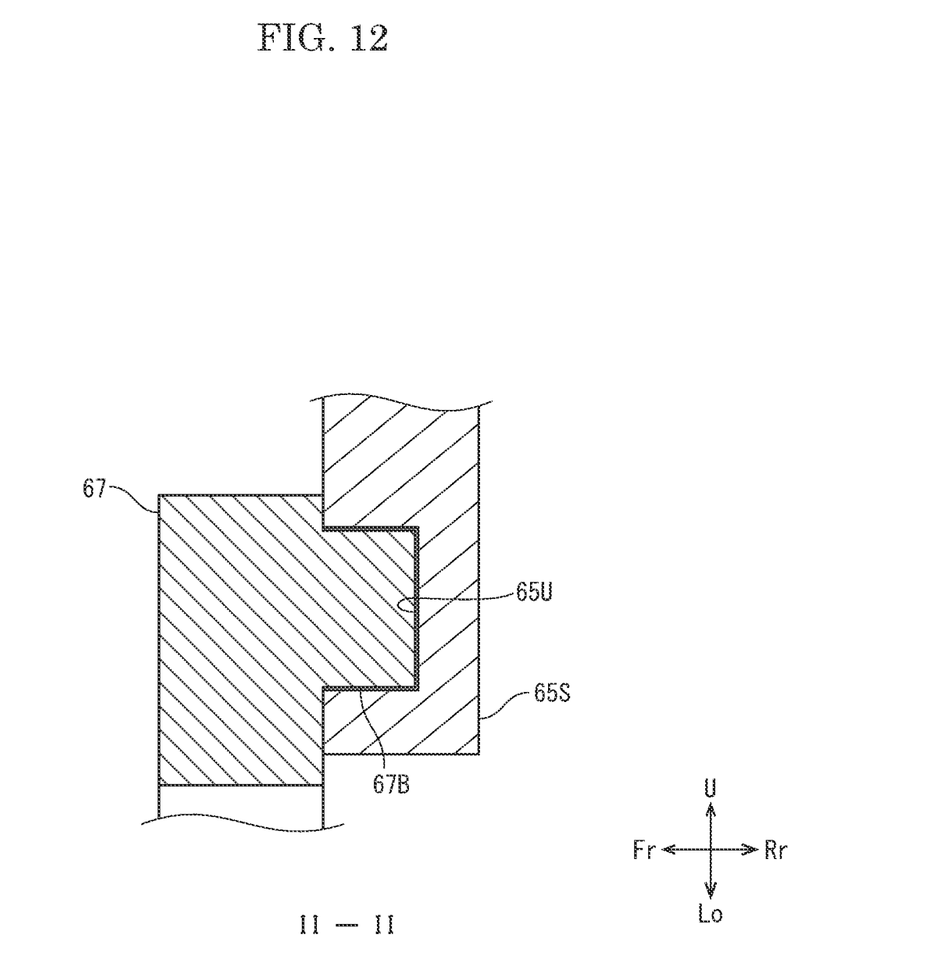
FIG. 12 is a sectional view taken along the line II-II in FIG. 11.

In the above embodiment, an example where the protrusion 65B is provided in the support part 65S of the lower guide member 65 and the groove 67U is provided in the coupling member 67 is shown, but the turning mechanism 34 may be configured as follows. FIG. 11 is a front view of the turning mechanism 34 according to the modified example. FIG. 12 is a cross sectional view taken along the line II-II of FIG. 11. In this modified example, the support part 65S of the lower guide member 65 is provided with a groove 65U while the coupling member 67 is provided with a protrusion 67B. The protrusion 67B is inserted into the groove 65U in a slidable manner along the groove 65U. With this configuration, the same effects as those of the above-described embodiment can be obtained.

Figure 13:
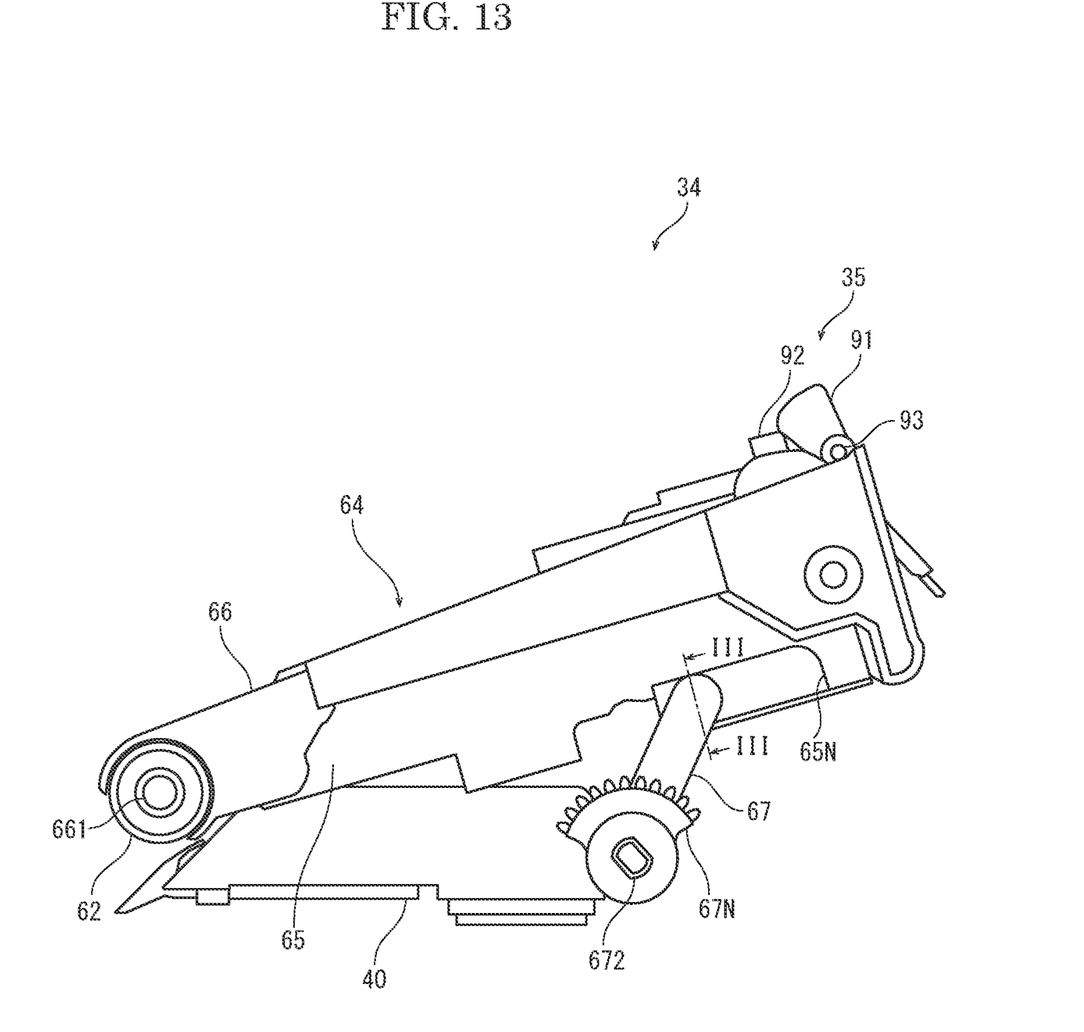
FIG. 13 is a front view showing the turning mechanism 34 of a modified example of the embodiment of the present disclosure.
Figure 14:
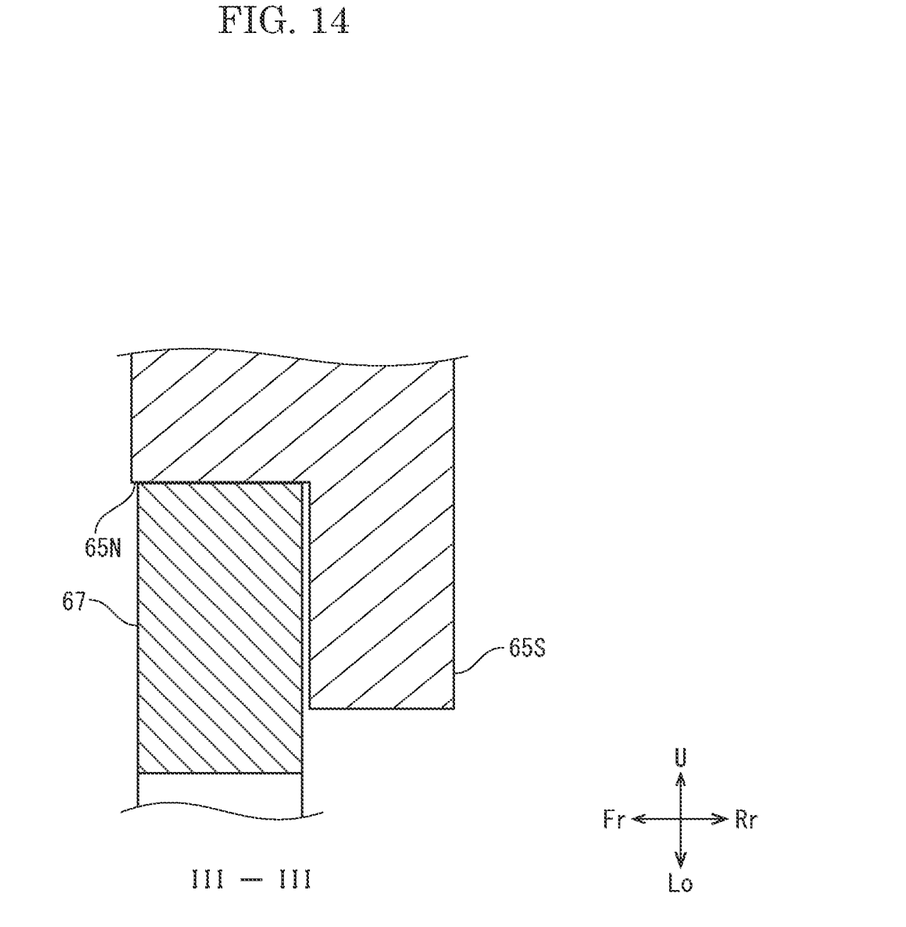
FIG. 14 is a sectional view taken along the line III-III in FIG. 13.

Alternatively, the turning mechanism 34 may be configured as follows. FIG. 13 is a front view showing the turning mechanism 34 according to the modified example. FIG. 14 is a cross sectional view taken along the line III-III of FIG. 13. In this example, a step portion 65N is provided at the bottom of the support part 65S of the lower guide member 65, and the coupling member 67 can slide along the step portion 65N. With this configuration, the same effects as those of the above-described embodiment can be obtained.

In the above embodiment, an example where the drive part 68 includes the reduction gear train 68R containing the worm gear 68W is shown, but the reduction gear train 68R may be composed of a spur gear, a diagonal gear, or the like without including the worm gear 68W.

In the above embodiment, an example where the document conveyance device 120 incudes the controller 47 is shown, but the scanner 110 may include the controller 47. Alternatively, the controller 2 of the printer 1 has a function of the controller 47.

The invention claimed is:

1. An image forming apparatus comprising:
a sheet feeding tray on which a document is placed;
a sheet discharge tray provided below the sheet feeding tray; and
a conveyance mechanism which conveys the document along a conveyance path from the sheet feeding tray to the sheet discharge tray via a reading position, wherein the conveyance mechanism includes:
a guide part provided as the conveyance path on a downstream side of the reading position in a conveyance direction of the document, and having a sheet discharge port through which the document is discharged to the sheet discharge tray;

a first turning shaft supporting the guide part so as to be turned around an axis along a width direction of the document crossing to the conveyance direction;

a second turning shaft provided on the downstream side of the first turning shaft in the conveyance direction and below the guide part, and whose axial direction is along the width direction;

a coupling member having one end portion supported by the second turning shaft in a turnable manner and the other end portion provided so as to be slidable with respect to the guide part;

a drive part which turns the coupling member around the second turning shaft; and a controller to control the drive part so as to turn the coupling member around the second turning shaft, to turn the guide part around the first turning shaft and to change a height of the sheet discharge port.

2. The document conveyance device according to claim 1, wherein
a guide part has a protrusion protruding in the width direction, and
the coupling member has a groove part into which the protrusion is slidable in directions away from and close to the second turning shaft.

3. The document conveyance device according to claim 2, wherein
the protrusion is formed at a position closer to the sheet discharge port than the second turning shaft.

4. The document conveyance device according to claim 1, wherein
the guide part has a lower guide member and an upper guide member facing each other in an upper-and-lower direction, and
the upper guide member is supported in a turnable manner around the first turning shaft.

5. The document conveyance device according to claim 1, wherein
the first turning shaft is a shaft of a drive roller of a conveyance rollers pair which conveys the document along the guide part.

6. The document conveyance device according to claim 1, wherein
the drive part includes a reduction gear train containing a worm gear.

7. The document conveyance device according to claim 1, further comprising a control part which controls the drive part so as to change the height of the sheet discharge port according to an amount of the documents stacked on the sheet discharge tray.

8. An image forming system comprising:
the sheet conveyance device according to claim 1;
an image reading device which reads the document conveyed by the sheet conveyance device at the reading position; and
an image forming device which forms an image read by the image reading device on a sheet.

* * * * *